(12) United States Patent
Shimoda et al.

(10) Patent No.: US 10,876,639 B2
(45) Date of Patent: Dec. 29, 2020

(54) MOUNTING STRUCTURE OF VALVE PLATE WITH RESPECT TO VALVE ROD

(71) Applicant: SMC CORPORATION, Chiyoda-ku (JP)

(72) Inventors: Hiromi Shimoda, Noda (JP); Takashi Nagao, Abiko (JP); Tsuyoshi Ochi, Tsukubamirai (JP); Hiroshi Ogawa, Okegawa (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/243,112

(22) Filed: Jan. 9, 2019

(65) Prior Publication Data

US 2019/0211936 A1    Jul. 11, 2019

(30) Foreign Application Priority Data

Jan. 10, 2018  (JP) ................. 2018-002203

(51) Int. Cl.
  *F16K 3/30* (2006.01)
  *F16K 3/314* (2006.01)
  *F16K 1/48* (2006.01)
  *F16K 51/02* (2006.01)

(52) U.S. Cl.
  CPC ............ *F16K 3/30* (2013.01); *F16K 1/487* (2013.01); *F16K 3/314* (2013.01); *F16K 51/02* (2013.01)

(58) Field of Classification Search
  CPC . F16K 3/30; F16K 51/02; F16K 1/487; F16K 3/314; F16K 3/0218; F16K 3/0281; F16K 3/0272
  See application file for complete search history.

(56) References Cited

U.S. PATENT DOCUMENTS

| 2011/0290340 | A1 | 12/2011 | Ishigaki et al. |
| 2012/0267556 | A1* | 10/2012 | Shimoda ............... F16K 3/18 |
| | | | 251/301 |
| 2016/0238154 | A1* | 8/2016 | Alman ................ F16K 1/36 |

FOREIGN PATENT DOCUMENTS

JP        2005-291221        10/2005

OTHER PUBLICATIONS

Machine translation of JP2005291221, retrieved Feb. 13, 2020 (Year: 2005).*
Extended European Search Report dated Jun. 3, 2019 in European Patent Application No. 18211845.5, 10 pages.

* cited by examiner

*Primary Examiner* — Michael R Reid
(74) *Attorney, Agent, or Firm* — Oblon, McClelland, Maier & Neustadt, L.L.P.

(57) ABSTRACT

When a part of a hole rear wall of a mounting hole formed in a valve plate and a part of a rod rear wall of a mounting portion of a valve rod have formed thereat inclined portions, respectively, that produce a wedge effect by abutting upon each other and when the valve plate and the valve rod are fixed in a direction of an axis by a valve-plate fixing screw, a wedge effect when the inclined portions and abut upon each other causes a rod front wall of the mounting portion and a hole front wall of the mounting hole to come into close contact with each other and the valve plate and the valve rod to be precisely and firmly fixed to each other so as not to rotate relative to each other.

10 Claims, 15 Drawing Sheets

MOUNTING STRUCTURE OF VALVE PLATE WITH RESPECT TO VALVE ROD

TECHNICAL FIELD

The present invention relates to a mounting structure for mounting a valve plate of a gate valve onto an end of a valve rod.

BACKGROUND ART

In a semiconductor processing device, a gate valve is used in opening and closing an opening that communicates with a vacuum chamber. The gate valve has a structure in which a valve plate mounted on an end of a valve rod is accommodated in a valve box, the valve box is mounted at a vacuum chamber, and the opening formed in a side wall of the valve box is opened and closed by the valve plate. Here, the opening is closed by pushing a seal member mounted on the valve plate against a valve seat around the opening.

In the gate valve, since the seal member gradually deteriorates as it is used, the seal member in a deteriorated stage needs to be replaced with a new seal member. In this case, hitherto, it has been necessary to, after removing the gate valve from the vacuum chamber, remove the valve plate from the valve rod, take out the valve plate from the valve box, and, then, replace the seal member, as a result of which it took a good deal of effort and time to perform the replacement. Therefore, emergence of gate valves that allow a seal member to be easily and quickly replaced is desired.

In recent years, since line widths of semiconductors are increasingly becoming narrower, reducing the amount of particles that are produced at the time of a processing step (goal is zero particles) is an issue. In order to realize this, in the gate valve, elimination of occurrence of rubbing between each component at the time of operation is becoming an important issue.

On the other hand, Patent Literature 1 discloses a gate valve that, while the gate valve is mounted at the vacuum chamber, allows the valve plate to be removed from the valve rod and the valve plate to be taken out from the valve box. This improved gate valve allows the valve plate to be removed in a direction of an axis of the valve rod by fixing the valve plate to an upper end of the valve rod with a screw, and allows the valve plate to be removed from the valve rod and the valve plate to be taken out from an upper surface of the valve box by removing a cover from the upper surface of the valve box and loosening the screw. Therefore, in the improved gate valve, when replacing a seal member, the gate valve need not be removed from the vacuum chamber and only the valve plate can be easily and quickly taken out from the valve box.

However, in the gate valve disclosed in Patent Literature 1 above, when the valve plate is rotatably mounted on the valve rod and is pushed against a valve seat section, the valve plate rotates so as to follow the valve seat, as a result of which rubbing occurs between the valve plate and the valve seat and particles tend to be produced due to the rubbing, which is a disadvantage. In order not to produce particles, it is essential to precisely and firmly fix the valve plate to the valve rod so as not to rotate relative thereto.

CITATION LIST

Patent Literature

[PTL 1] Japanese Unexamined Patent Application Publication No. 2005-291221

SUMMARY OF INVENTION

Technical Problem

A technical object of the present invention is to connect a valve plate and a valve rod to each other such that the valve plate can be easily and quickly taken out from a valve box and, at the same time, to prevent production of particles when a gate valve operates by firmly fixing the valve plate and the valve rod to each other.

Solution to Problem

To solve the above-described problem, according to the present invention, in a gate valve configured such that a valve plate mounted on an end of a valve rod is accommodated in a valve box and an opening formed in a side wall of the valve box is opened and closed by the valve plate, a mounting structure for mounting the valve plate onto the end of the valve rod so as to be removable in a direction of an axis of the valve rod is provided. In this mounting structure, the valve plate includes a valve front surface on which a seal member is mounted, a valve rear surface on a side opposite to the valve front surface, a valve upper surface and a valve lower surface, and a mounting hole formed in the valve lower surface; the mounting hole has a shape of a slot that is long and narrow in a left-right direction of the valve plate and includes a hole front wall that is located on a side of the valve front surface, a hole rear wall that is located on a side of the valve rear surface, left and right hole side walls, and a hole end wall, which is an end portion of the mounting hole in a depth direction; the valve rod includes a mounting portion that is inserted into the mounting hole, and the mounting portion includes a rod front wall that faces the hole front wall of the mounting hole, a rod rear wall that faces the hole rear wall of the mounting hole, left and right rod side walls, and a rod end wall that faces the hole end wall of the mounting hole; in the valve upper surface of the valve plate and in the rod end wall of the valve rod, a screw insertion hole and a screw hole for mounting a valve-plate fixing screw that fixes the valve plate to the valve rod are formed on the axis of the valve rod; and in a part of the hole rear wall of the mounting hole and a part of the rod rear wall of the mounting portion, respective inclined portions that, by abutting upon each other, cause the rod front wall of the mounting portion and the hole front wall of the mounting hole to be in close contact with each other are formed when the mounting portion has been inserted into the mounting hole and the valve plate has been fixed to the valve rod with the valve-plate fixing screw.

In the present invention, the hole front wall, the hole rear wall, and the hole end wall of the mounting hole, and the rod front wall, the rod rear wall, and the rod end wall of the mounting portion are each flat.

A first inclined portion formed at the hole rear wall of the mounting hole is formed at a portion from an intermediate position of the mounting hole in the depth direction to an inlet of the mounting hole, and is inclined in a direction in which an interval between the hole rear wall and the hole front wall gradually increases with decreasing distance from the inlet; and a second inclined portion formed at the rod rear wall of the mounting portion is formed at a portion from an intermediate position of the mounting portion in the direction of the axis to a base end portion of the mounting portion, and is inclined in a direction in which an interval between the rod rear wall and the rod front wall gradually increases with decreasing distance from the base end portion.

In this case, it is desirable that the hole rear wall of the mounting hole include a first parallel portion that is between the hole end wall and the first inclined portion and is parallel to the hole front wall, the rod rear wall of the mounting portion include a second parallel portion that is between the rod end wall and the second inclined portion and is parallel to the rod front wall, and a width of the first parallel portion in the direction of the axis be larger than a width of the second parallel portion in the direction of the axis.

In the present invention, desirably, an air hole for allowing air in the screw hole to escape to outside is formed in the mounting portion of the valve rod so as to communicate with a gap between the mounting portion and the mounting hole.

In the present invention, it is desirable that a first tool mounting hole, which is formed from a screw hole, be formed in the valve upper surface of the valve plate in order to displace the valve plate with respect to the valve rod in the direction of the axis by screwing in a first tool, which is formed from a screw rod, and the first tool mounting hole be formed at a position in the valve upper surface that is adjacent to the screw insertion hole and that is in correspondence with the rod end wall of the valve rod so as to reach the mounting hole from the valve upper surface.

Alternatively, it is desirable that two second tool mounting holes be formed in the valve upper surface of the valve plate in order to mount a second tool for lifting the valve plate in the direction of the axis and removing the valve plate from the valve rod, and the two second tool mounting holes be formed at symmetrical positions, one on a left and one on a right of the screw insertion hole in the valve upper surface.

Advantageous Effects of Invention

According to the present invention, it is possible to, by connecting the valve plate with respect to the valve rod so as to be removable in the direction of the axis of the valve rod, easily and quickly take out the valve plate from the valve box, and it is possible to, by precisely and firmly fixing the valve plate to the valve rod so as not to rotate relative thereto, prevent production of particles resulting from rubbing between the valve plate and the valve rod.

DESCRIPTION OF EMBODIMENTS

Figure 1:
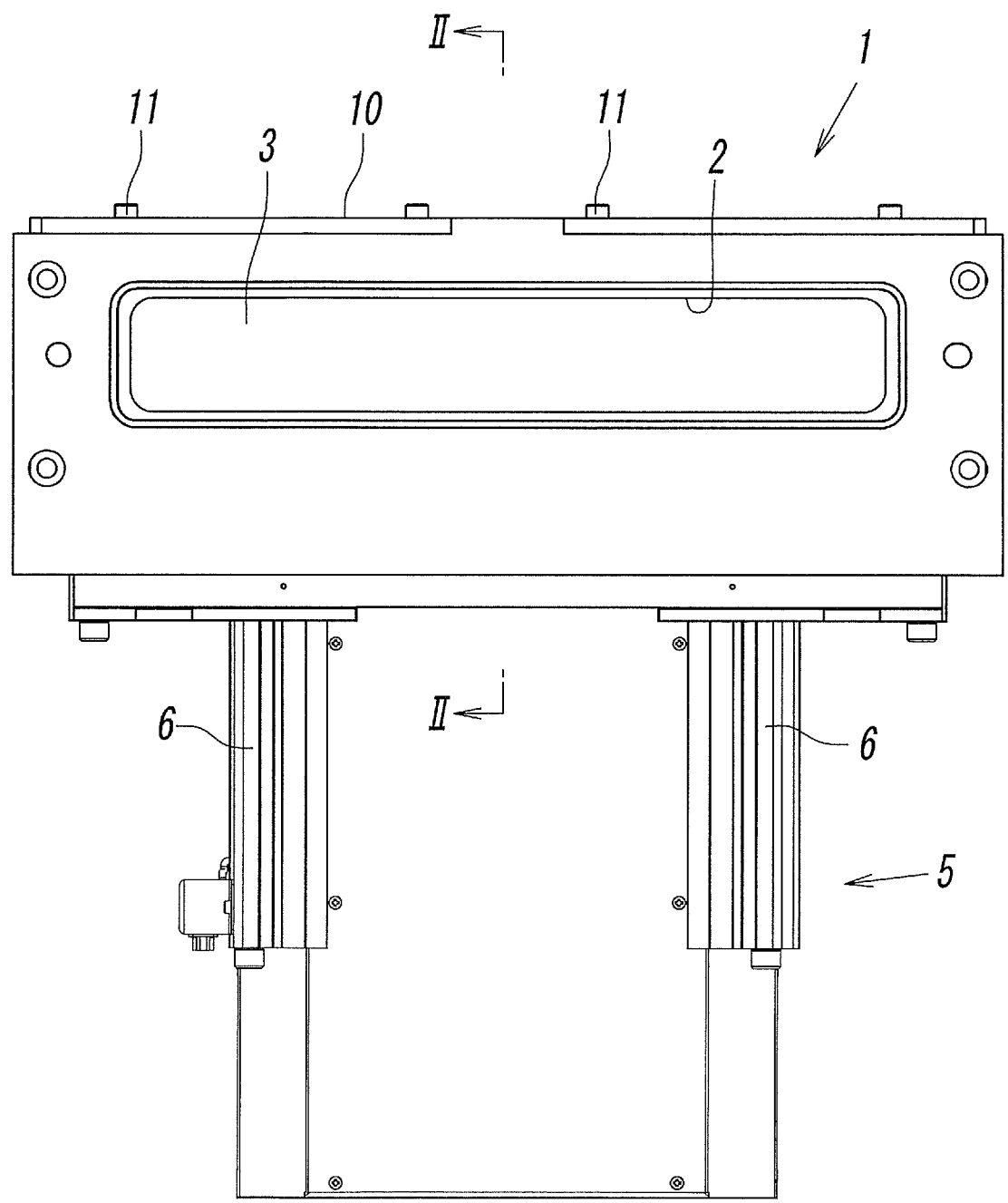
FIG. 1 is a front view of a gate valve to which the present invention has been applied.
Figure 2:
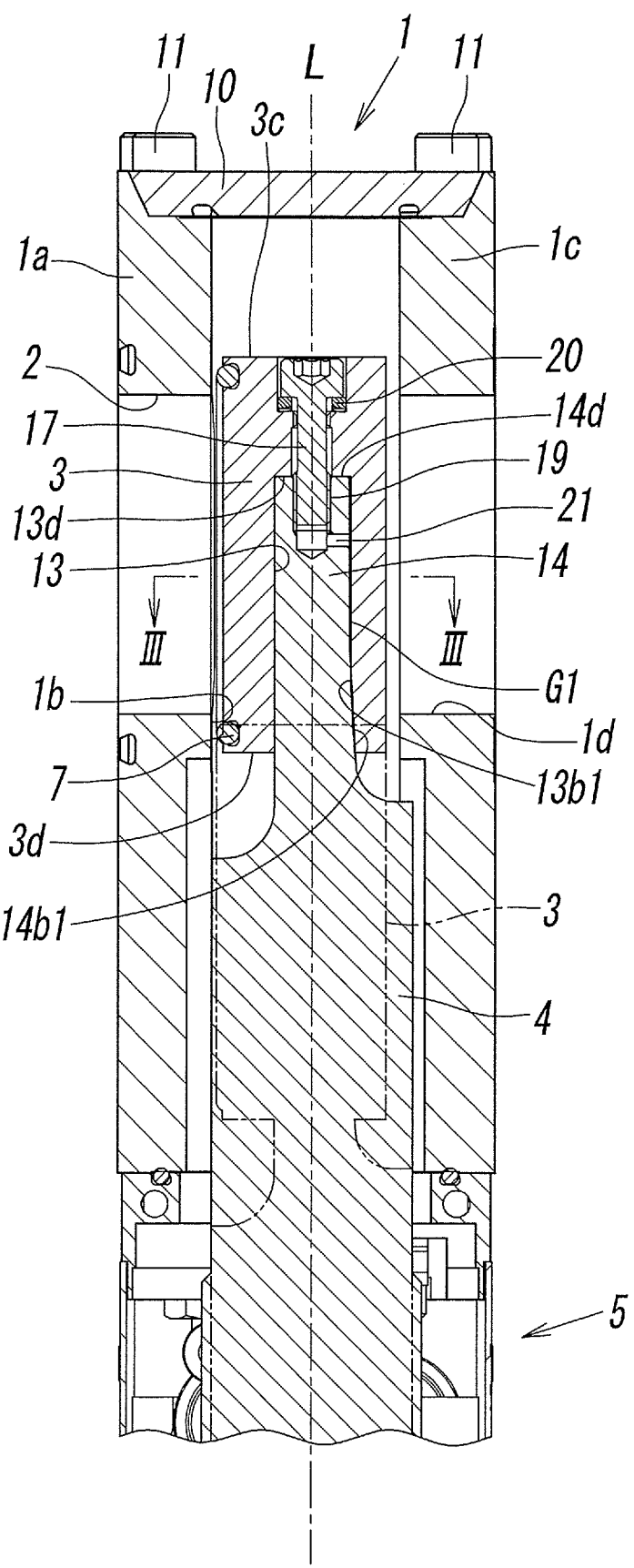
FIG. 2 is a partial enlarged sectional view along line II-II of FIG. 1.
Figure 3:
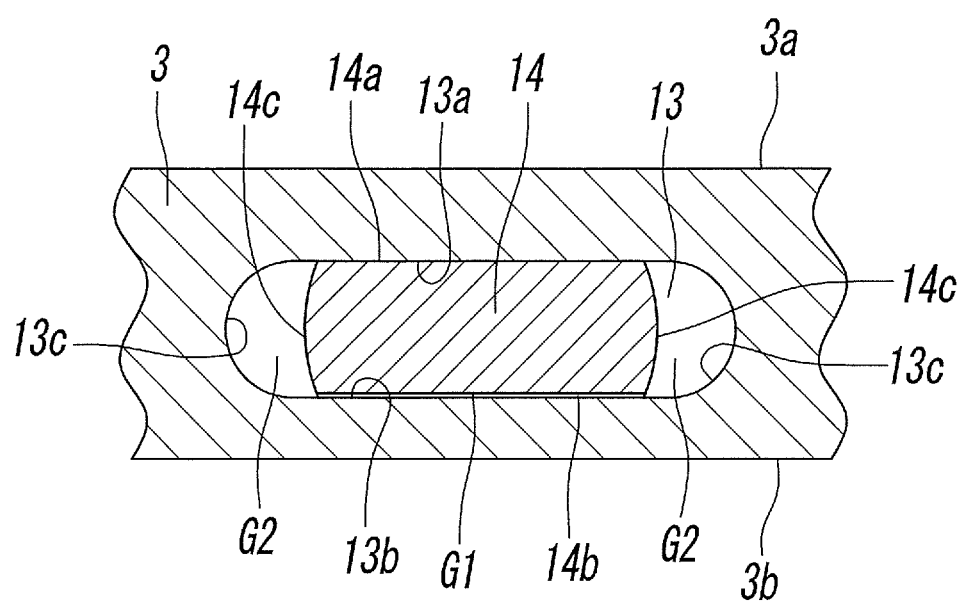
FIG. 3 is a partial enlarged sectional view along line III-III of FIG. 2 and is a view in which a view orientation has been changed by 90 degrees.

FIGS. 1 and 2 each shows a gate valve in which a mounting structure of the present invention has been applied to mounting a valve plate and a valve rod onto each other. The gate valve is used by being mounted at a vacuum chamber (not shown) and includes a valve box 1 having an opening 2 that communicates with the vacuum chamber, the valve plate 3 that is accommodated inside the valve box 1 and that opens and closes the opening 2, the valve rod 4 that is fixed to the valve plate 3 and that is provided for an opening-closing operation, and a valve driving section 5 that drives the valve rod 4. The gate valve is one in which, by driving the valve rod 4 by the valve driving section 5, the valve plate 3 is moved upward and downward to a closing position, which is a position for closing the opening 2 and which is indicated by a solid line, and to a standby position, where the opening 2 is opened and which is indicated by a chain line. A driving mechanism 6, such as an air cylinder, is provided at the valve driving section 5; however, since the structures and operations of the valve driving section 5 and the driving mechanism 6 are publicly known, they are not described here.

The valve box 1 has the shape of a rectangular box that is long and narrow sideways, and has a structure in which the rectangular opening 2 that is long and narrow sideways and a planar valve seat 1b that surrounds the opening 2 are formed at, out of front and rear side walls 1a and 1c of the valve box 1, the front side wall 1a that is connected to the vacuum chamber and in which the opening 2 is closed at the closing position by pushing a seal member 7 mounted on a front surface of the valve plate 3 against the valve seat 1b.

Figure 7:
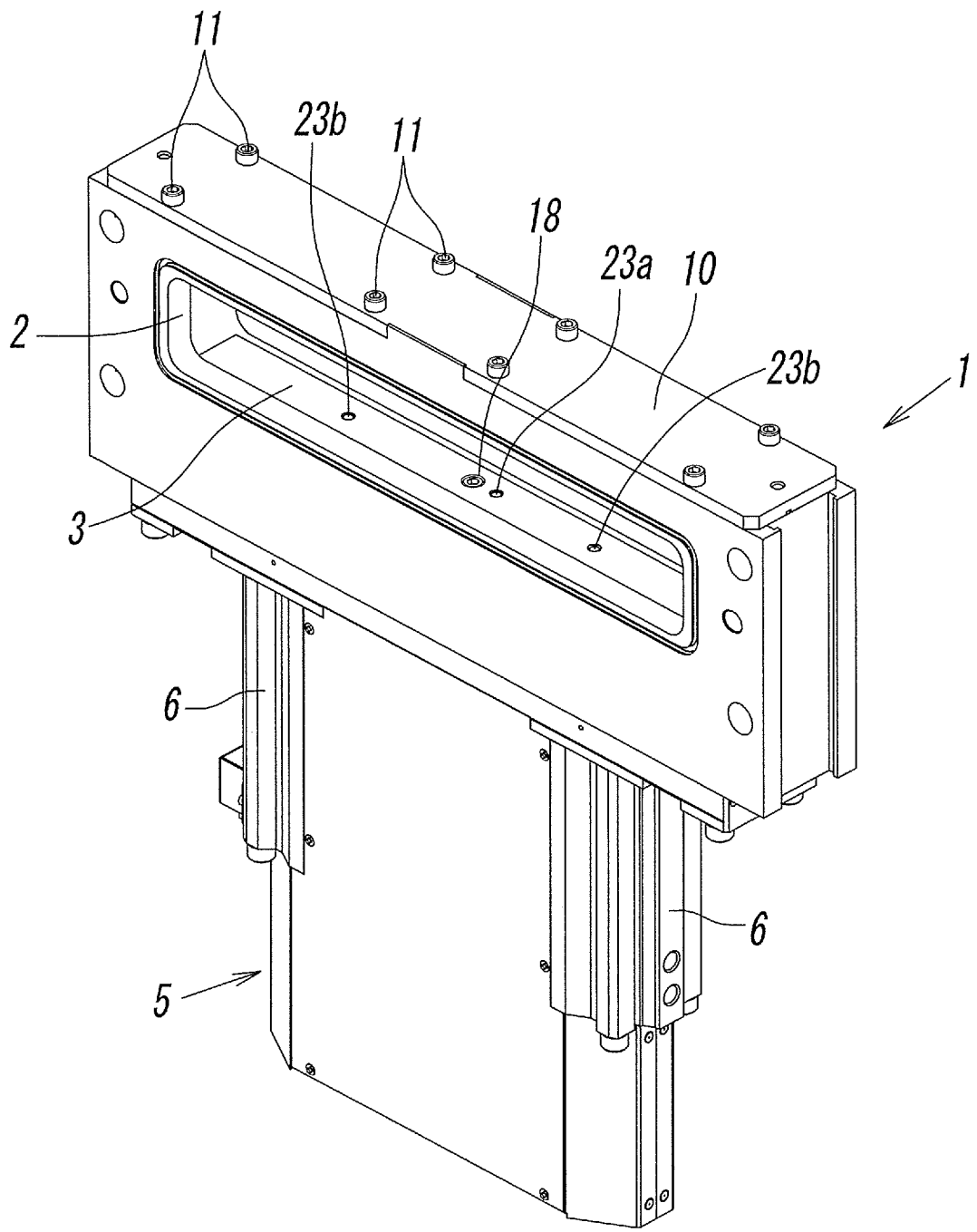
FIG. 7 is a perspective view of the gate valve before taking out the valve plate.
Figure 8:
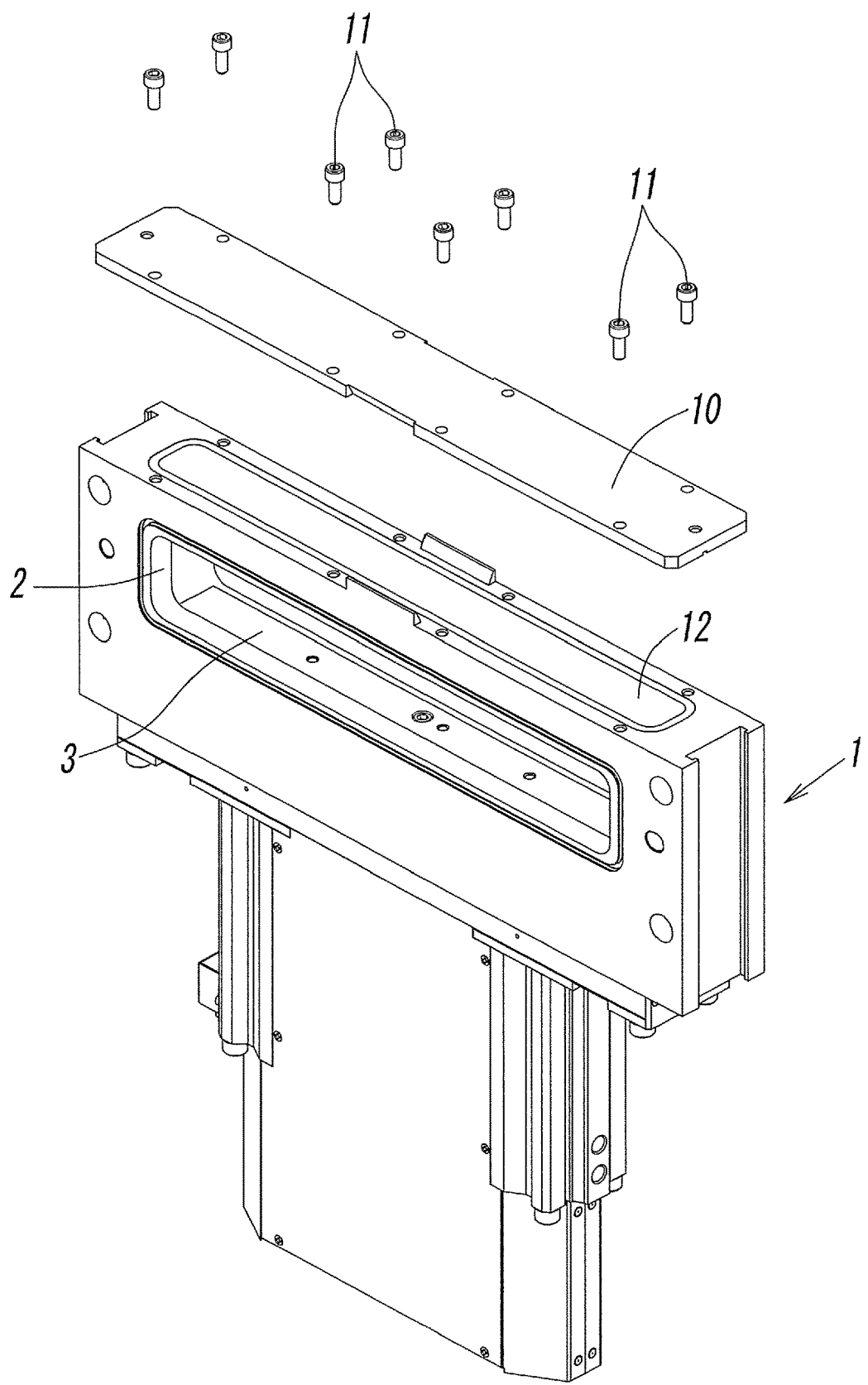
FIG. 8 is a perspective view of the gate valve in a state in which a cover on an upper surface of a valve box has been removed.

As is clear from FIGS. 7 and 8, a cover 10 is removably mounted on an upper surface of the valve box 1 with a plurality of cover mounting screws 11, the upper surface of the valve box 1 is openable by removing the cover 10, and the valve plate 3 can be taken out along an axis L from a window hole 12 in the open upper surface by removing the valve plate 3 from the valve rod 4.

Note that, although, in the valve box 1, an opening 1d is also formed in the rear side wall 1c, the opening 1d is not opened and closed by the valve plate 3.

As is clear from FIGS. 2 to 6, the valve plate 3 has the shape of a rectangular plate that is long and narrow sideways and includes a valve front surface 3a on which the seal member 7 is mounted, a valve rear surface 3b on a side opposite to the valve front surface 3a, a valve upper surface 3c and a valve lower surface 3d, and a mounting hole 13 formed in the valve lower surface 3d. The valve front surface 3a, the valve rear surface 3b, the valve upper surface 3c, and the valve lower surface 3d are each a flat surface.

The mounting hole 13 is a hole for inserting and fixing a mounting portion 14 at an end (upper end) of the valve rod 4 and a cross-sectional shape of the mounting hole 13 has the shape of a slot that is long and narrow in a longitudinal direction, that is, a left-right direction of the valve plate 3. The mounting hole 13 includes a hole front wall 13a that is located on a side of the valve front surface 3a, a hole rear wall 13b that is located on a side of the valve rear surface 3b, left and right hole side walls 13c and 13c, and a hole end wall 13d, which is an end portion of the mounting hole 13 in a depth direction. The hole front wall 13a, the hole rear wall 13b, and the hole end wall 13d are each a flat surface, and the hole side walls 13c and 13c are each a concave surface that is semi-circular. The hole end wall 13d and the hole front wall 13a are formed consecutively at right angles to each other, and the hole end wall 13d and a first parallel portion 13b2, which is a part of the hole rear wall 13b, are also formed consecutively at right angles to each other.

The valve rod 4 includes, on an end of a columnar main body portion 4a, the mounting portion 14 for insertion into the mounting hole 13. The mounting portion 14 has a shape in which a side surface in a diametrical direction of a column is cut along two parallel planes on both sides of the axis L, and includes a rod front wall 14a that faces the hole front wall 13a of the mounting hole 13, a rod rear wall 14b that faces the hole rear wall 13b of the mounting hole 13, left and right rod side walls 14c and 14c that face the left and right hole side walls 13c and 13c of the mounting hole 13, and a rod end wall 14d that faces the hole end wall 13d of the mounting hole 13.

The rod front wall 14a, the rod rear wall 14b, and the rod end wall 14d are each a flat surface and the rod side walls 14c and 14c are each a concave surface having an arc shape. The rod end wall 14d and the rod front wall 14a are formed consecutively at right angles to each other and the rod end wall 14d and a second parallel portion 14b2, which is a part of the rod rear wall 14b, are also formed consecutively at right angles to each other.

Further, by making the width of the mounting hole 13 in a long-axis direction larger than the diameter of the valve rod 4, a gap G2 is formed between the hole side walls 13c and 13c of the mounting hole 13 and the rod side walls 14c and 14c of the mounting portion 14.

The valve plate 3 is mounted on the end of the valve rod 4 so as to be removable in the direction of axis L of the valve rod by using a valve-plate fixing screw 17. For this mounting, in the valve upper surface 3c of the valve plate 3, a screw insertion hole 18 for inserting the valve-plate fixing screw 17 is formed on the axis L, and in the rod end wall 14d of the valve rod 4, a screw hole 19 for screwing the valve-plate fixing screw 17 is formed on the axis L.

The valve-plate fixing screw 17 includes a screw head 17a with a hexagon socket, a shaft portion 17b whose outer periphery is not threaded, and a screw portion 17c whose outer periphery is threaded. The outside diameter of the screw portion 17c is larger than the outside diameter of the shaft portion 17b.

The screw insertion hole 18 of the valve plate 3 includes a large-diameter portion 18a that accommodates the screw head 17a of the valve-plate fixing screw 17, a small-diameter portion 18b into which the screw portion 17c and the shaft portion 17b of the valve-plate fixing screw 17 are inserted, and a come-off preventing section 18c that prevents the valve-plate fixing screw 17 from coming off the valve plate 3 by engaging with the screw portion 17c of the valve-plate fixing screw 17 when the valve-plate fixing screw 17 is loosened when the seal member 7 is replaced.

Figure 4:
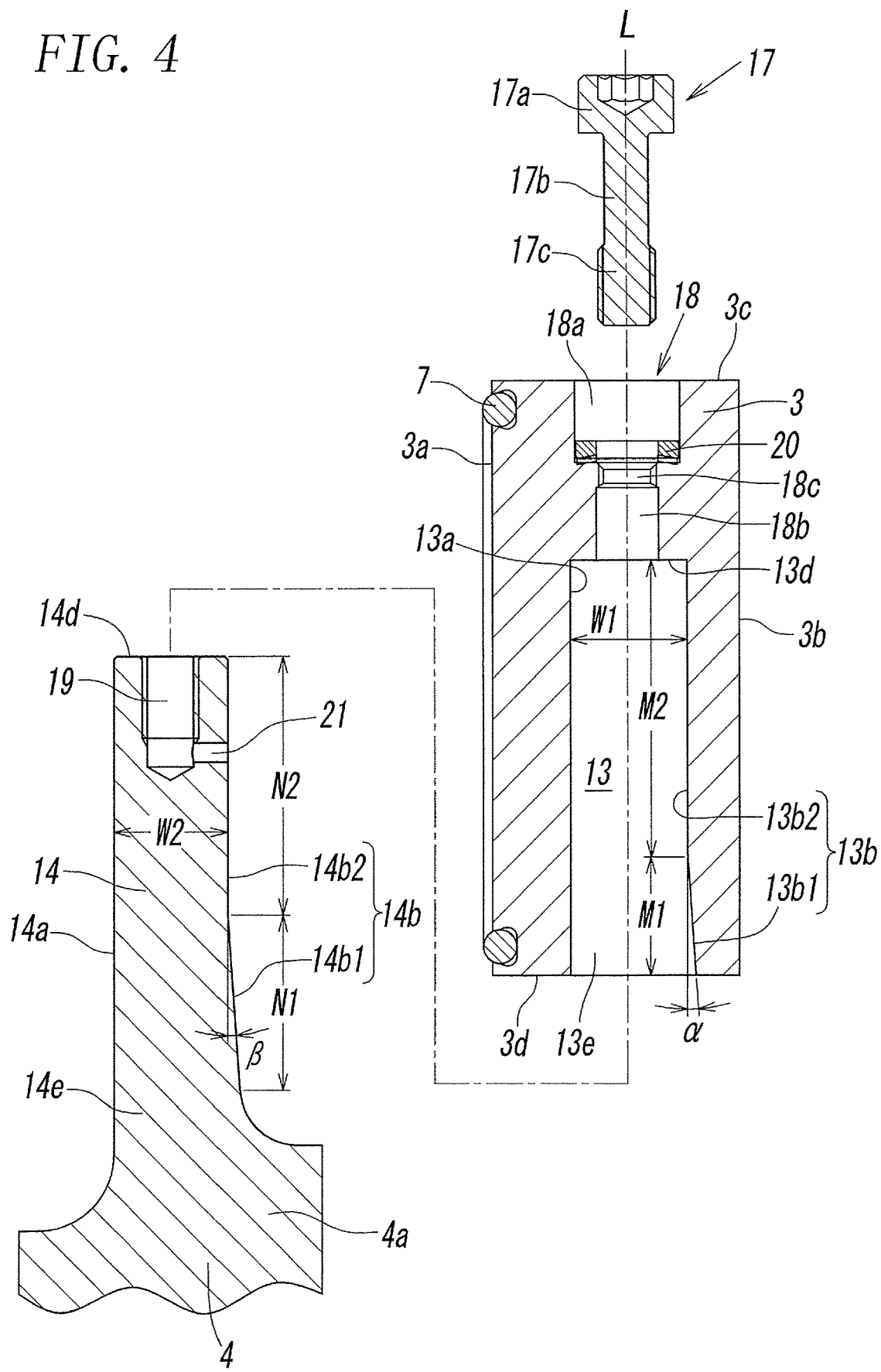
FIG. 4 is a sectional view in which a valve plate, a valve rod, and a valve-plate fixing screw are separated from each other.

The inside diameter and the depth of the large-diameter portion 18a have magnitudes that allow the screw head 17a of the valve-plate fixing screw 17 to be completely accommodated together with a washer 20. The inside diameter of the small-diameter portion 18b is smaller than the inside diameter of the large-diameter portion 18a and is larger than the outside diameter of the screw portion 17c of the valve-plate fixing screw 17. The inside diameter of the come-off preventing section 18c is larger than the outside diameter of the shaft portion 17b of the valve-plate fixing screw 17 and is smaller than the outside diameter of the screw portion 17c. A screw hole is formed in an inner periphery of the come-off preventing section 18c and, when the valve-plate fixing screw 17 is to be mounted on the valve plate 3, the screw portion 17c of the valve-plate fixing screw 17 is screwed into the screw hole of the come-off preventing section 18c and is caused to advance up to a position where it passes the come-off preventing section 18c. As shown in FIG. 4, when the valve-plate fixing screw 17 is to be completely removed from the valve plate 3, reverse operations thereof are performed.

Due to this configuration, when the valve plate 3 is to be fixed to the end of the valve rod 4, as shown in FIG. 2, the mounting portion 14 of the valve rod 4 is inserted into the mounting hole 13 of the valve plate 3, the valve-plate fixing screw 17 is screwed into the screw hole 19 at the upper end of the mounting portion 14 and the valve-plate fixing screw 17 is tightened up to a position where the rod end wall 14d of the mounting portion 14 abuts upon the hole end wall 13d of the mounting hole 13, such that the valve plate 3 is fixed to the end of the valve rod 4.

Figure 10:
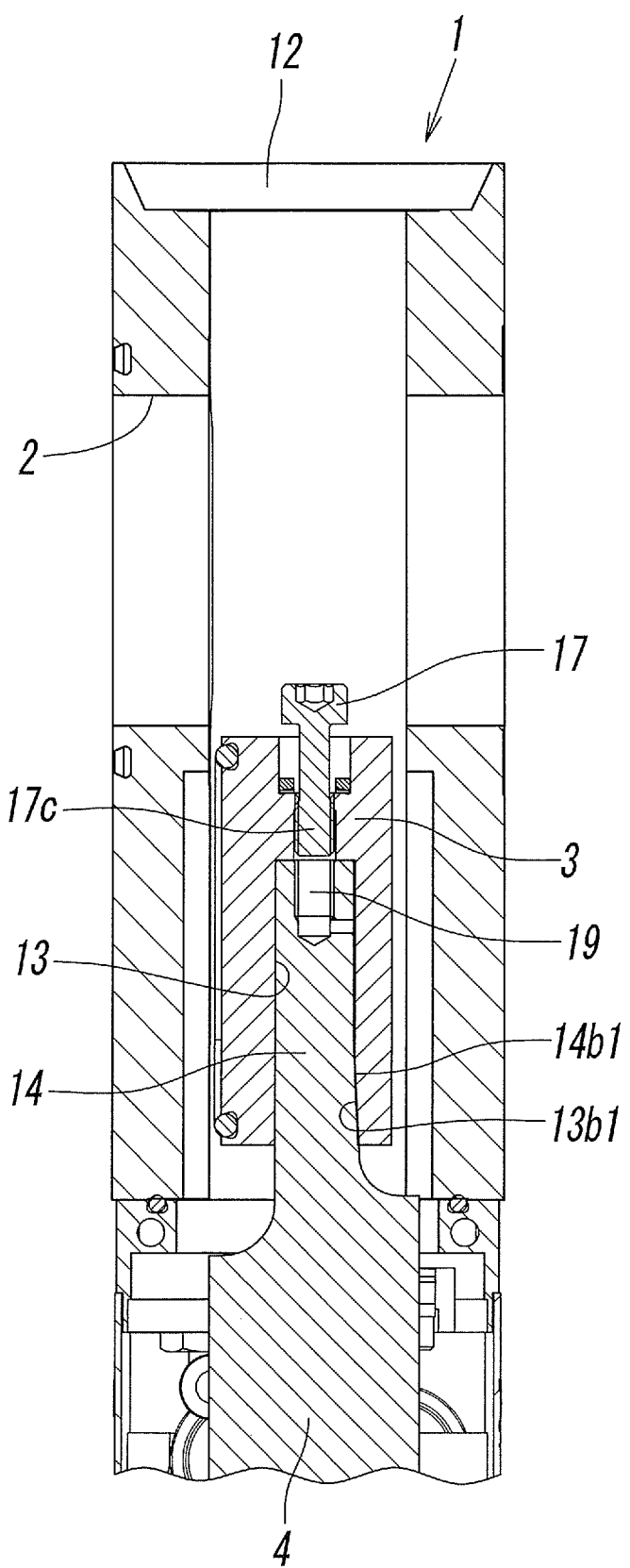
FIG. 10 is an enlarged sectional view of a main portion of FIG. 9.

As shown in FIG. 10, when the valve plate 3 is to be removed, the valve plate 3 is removed in the direction of the axis L from the valve rod 4 by loosening the valve-plate fixing screw 17 and removing the screw portion 17c from the screw hole 19.

Here, when the valve plate 3 is to be fixed to the valve rod 4, the hole front wall 13a of the mounting hole 13 and the rod front wall 14a of the mounting portion 14 are brought completely into strong and close contact with each other, and the valve plate 3 and the valve rod 4 are firmly fixed to each other so as not to be displaced relative to each other in a direction of rotation around the axis L as the center. Therefore, as is clear from FIGS. 2 and 4, an inclined portion 13b1 and an inclined portion 14b1 that produce a wedge effect by abutting upon each other are formed on a part of the hole rear wall 13b of the mounting hole 13 and a part of the rod rear wall 14b of the mounting portion 14, respectively.

Of these, a first inclined portion 13b1 formed at the hole rear wall 13b of the mounting hole 13 is formed at a portion from an intermediate position of the mounting hole 13 in the depth direction to an inlet 13e of the mounting hole 13, and is inclined in a direction in which an interval W1 between the hole rear wall 13b and the hole front wall 13a gradually increases with decreasing distance from the inlet 13e. The remaining portion of the hole rear wall 13b, that is, the portion from the hole end wall 13d to the first inclined portion 13b1 is the first parallel portion 13b2 that is parallel to the hole front wall 13a. A width M1 of the first inclined portion 13b1 in an up-down direction (a width of the mounting hole 13 in the depth direction) is smaller than a width M2 of the first parallel portion 13b2 in the up-down direction (a width of the mounting hole 13 in the depth direction).

A second inclined portion 14b1 formed at the rod rear wall 14b of the mounting portion 14 is formed at a portion from an intermediate position of the mounting portion 14 in the direction of the axis L to a base end portion 14e of the mounting portion 14, and is inclined in a direction in which an interval W2 between the rod rear wall 14b and the rod front wall 14a gradually increases with decreasing distance from the base end portion 14e. The remaining portion of the rod rear wall 14b, that is, the portion from the rod end wall 14d to the second inclined portion 14b1 is the second parallel portion 14b2 that is parallel to the rod front wall 14a. A width N1 of the second inclined portion 14b1 in the up-down direction (a width in the direction of the axis L) is smaller than a width N2 of the second parallel portion 14b2 in the up-down direction (a width in the direction of the axis L).

Further, the width M2 of the first parallel portion 13b2 in the up-down direction (the width in the direction of the axis L) is larger than the width N2 of the second parallel portion 14b2 in the direction of the axis.

An inclination angle □ of the first inclined portion 13b1 of the hole rear wall 13b with respect to the first parallel portion 13b2 and an inclination angle □ of the second inclined portion 14b1 of the mounting portion 14 with respect to the second parallel portion 14b2 are the same angle, and are desirably on the order of 2 to 4 degrees and more desirably, 3 degrees.

By forming the inclined portions 13b1 and 14b1, when, as described above, the valve-plate fixing screw 17 is tightened and the valve plate 3 is fixed to the valve rod 4, the first inclined portion 13b1 of the mounting hole 13 and the second inclined portion 14b1 of the mounting portion 14 abut upon each other, such that a wedge effect acts and the mounting portion 14 is pushed towards the side of the hole front wall 13a of the mounting hole 13 due to the wedge effect. Therefore, the rod front wall 14a of the mounting portion 14 is entirely and strongly pushed against the hole front wall 13a of the mounting hole 13 and comes into close contact with the hole front wall 13a, such that the valve plate 3 and the valve rod 4 are firmly fixed to each other so as not to rotate relative to each other around the axis L as the center.

At this time, a slight gap G1 is formed between the first parallel portion 13b2 of the mounting hole 13 and the second parallel portion 14b2 of the mounting portion 14, and the gap G1 communicates with the gap G2 between the hole side walls 13c and 13c of the mounting hole 13 and the corresponding rod side walls 14c and 14c of the mounting portion 14.

An air hole 21 for allowing air in the screw hole 19 to escape to the outside and for introducing air into the screw hole 19 from the outside when fastening and unfastening the valve-plate fixing screw 17 to and from the screw hole 19 is formed in the mounting portion 14 so as to extend therethrough from the screw hole 19 to the second parallel portion 14b2 of the rod rear wall 14b, such that the screw hole 19 and the gap G1 between the parallel portions 13b2 and 14b2 communicate with each other. However, the air hole 21 may also be formed such that the screw hole 19 and the gap G2 communicate with each other by causing the air hole 21 to open into the rod side walls 14c and 14c.

By firmly fixing the valve plate 3 and the valve rod 4 such that they do not rotate relative to each other in this way, for example, rubbing caused by displacement of the valve plate 3 and the valve rod 4 relative to each other or rubbing between the seal member 7 and the valve seat 1b are prevented when the gate valve operates. Therefore, production of particles caused by the rubbing between the components is suppressed. In addition, since the valve plate 3 and the valve rod 4 can be firmly fixed to each other by only providing the inclined portion 13b1 on a part of the mounting hole 13 of the valve plate 3 and the inclined portion 14b1 on a part of the mounting portion 14 of the valve rod 4, this structure is very simple.

Figure 5:
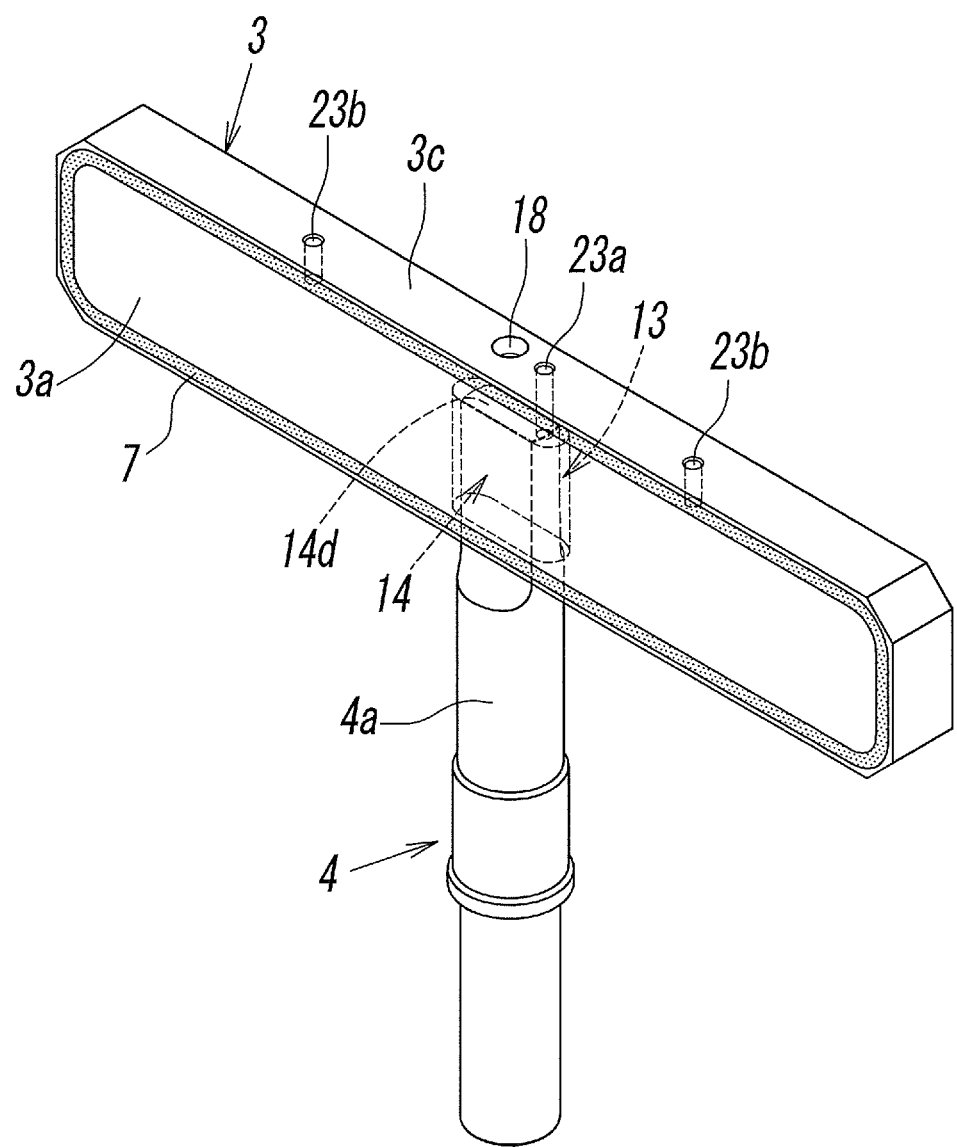
FIG. 5 is a perspective view of a state in which the valve plate has been fixed to the valve rod as seen from the front side.
Figure 6:
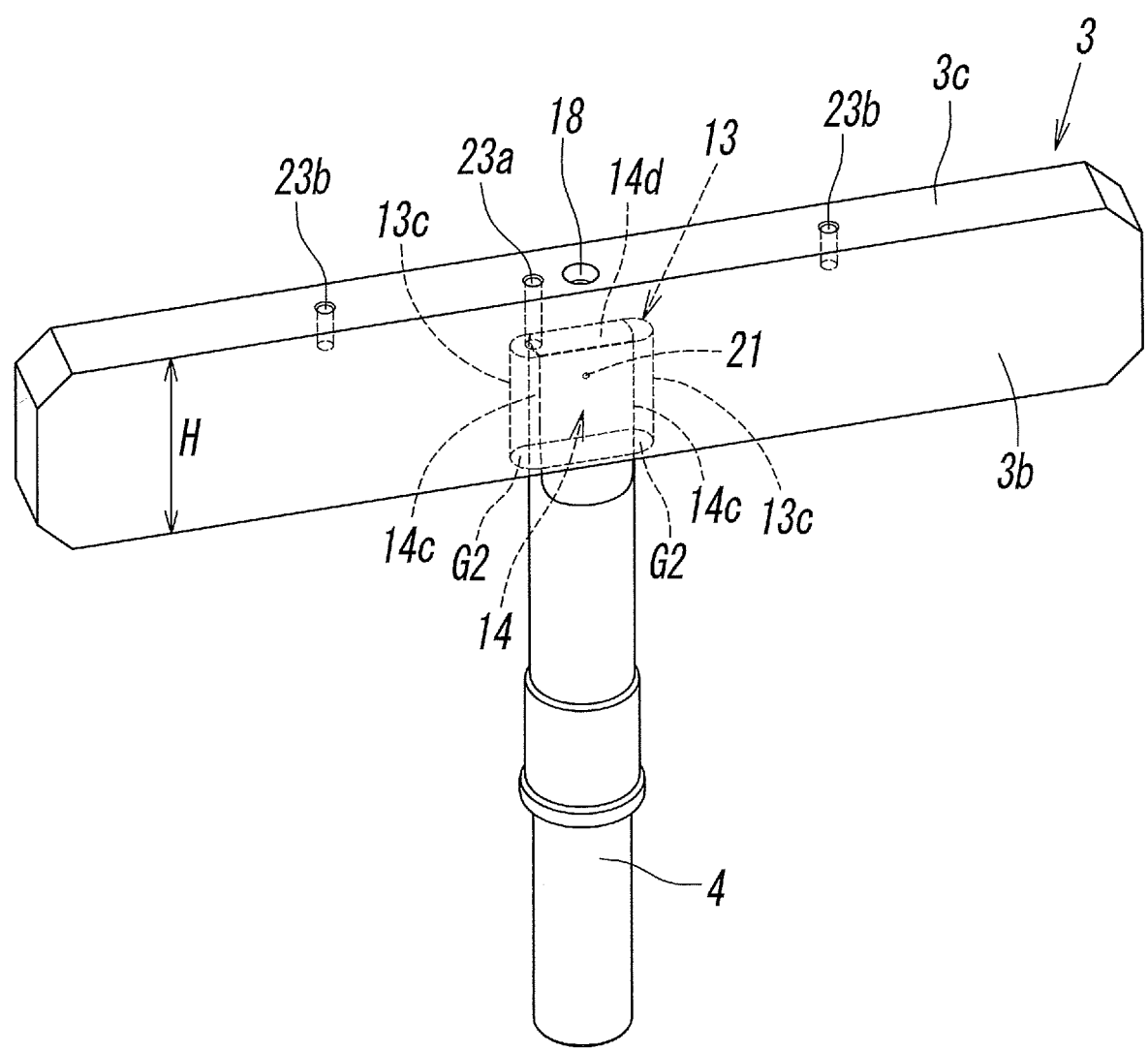
FIG. 6 is a perspective view of the valve plate and the valve rod of FIG. 5 as seen from the rear side.

In order to make it possible to easily remove the valve plate 3 firmly fixed to the valve rod 4, as shown in FIGS. 5 and 6, a plurality of tool mounting holes 23a and 23b for mounting operating tools 22a and 22b (see FIG. 14) are formed in the valve upper surface 3c of the valve plate 3. The tool mounting holes 23a and 23b are formed from screw holes and the tools 22a and 22b are formed from screw rods.

In the illustrated example, one first tool mounting hole 23a is formed at a position adjacent and close to the screw insertion hole 18 and two second tool mounting holes 23b and 23b are formed at symmetrical positions on the left and right of the axis L (screw insertion hole 18).

The first tool mounting hole 23a is for raising the valve plate 3 from the valve rod 4 by screwing a first tool 22a into the tool mounting hole 23a (see FIG. 12) and is formed at a position corresponding to the rod end wall 14d of the mounting portion 14 of the valve rod 4 so as to have a depth from the valve upper surface 3c to the mounting hole 13.

The second tool mounting holes 23b and 23b are for screwing in and mounting second tools 22b, are arranged at positions that are shifted from the rod end wall 14d in lateral directions, and have depths that are smaller than a vertical width H of the valve plate 3. Therefore, the second tool mounting holes 23b and 23b extend partway along the vertical width of the valve plate 3.

Figure 9:
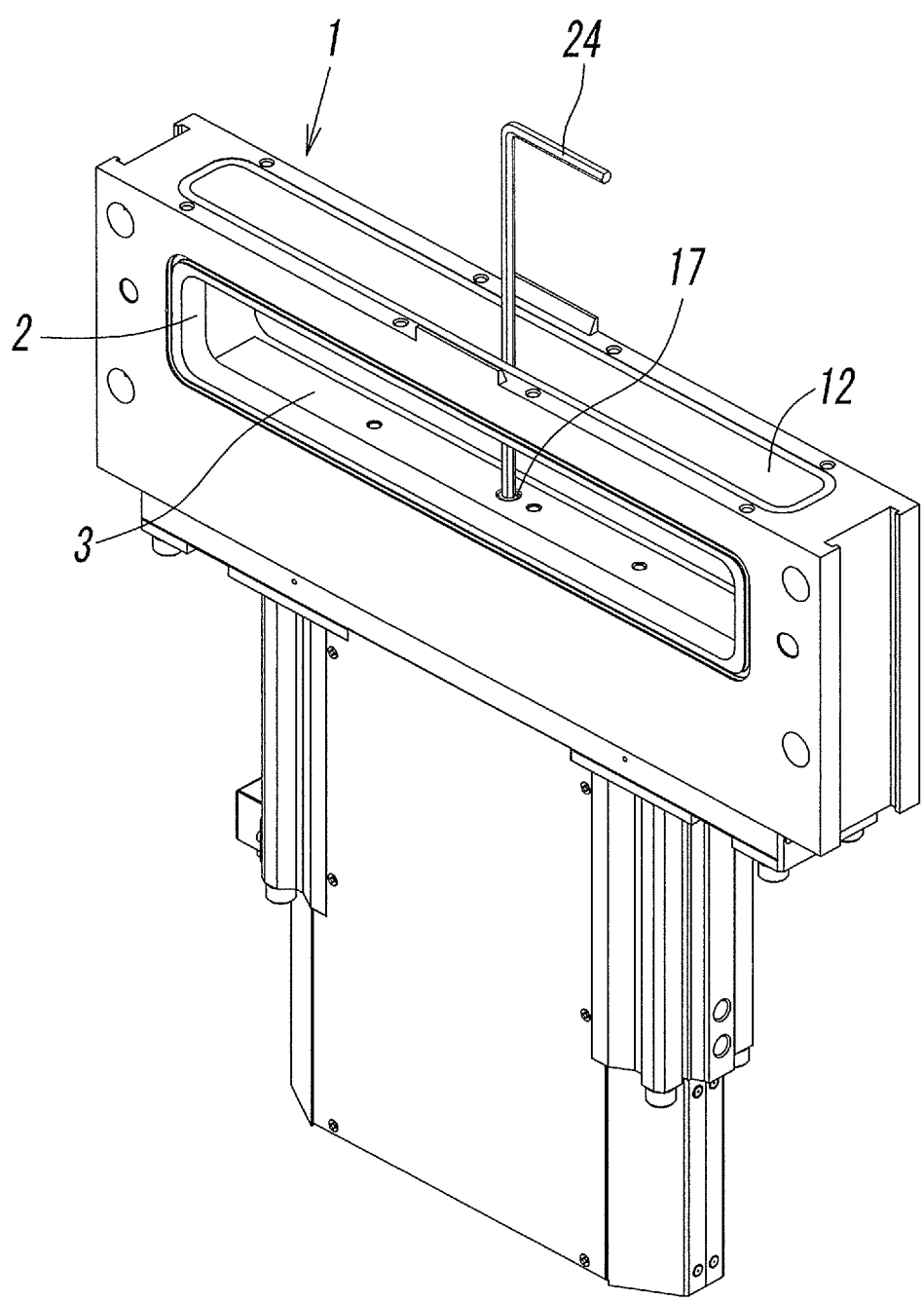
FIG. 9 is a perspective view of the gate valve when the valve-plate fixing screw that fixes the valve plate and the valve rod to each other is being loosened.
Figure 11:
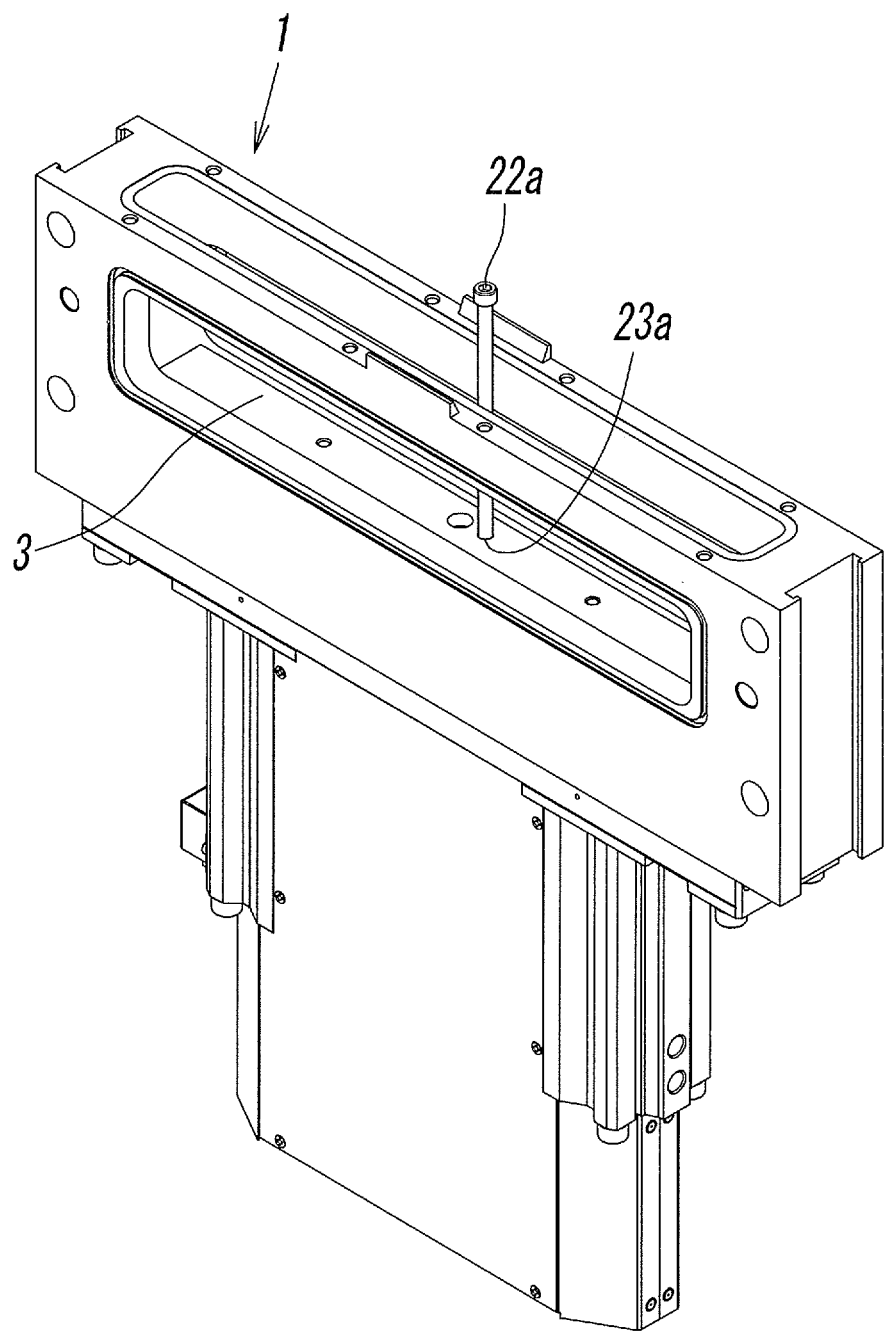
FIG. 11 is a perspective view of a gate valve when the valve plate is in the middle of being raised from the valve rod by a first tool.
Figure 12:
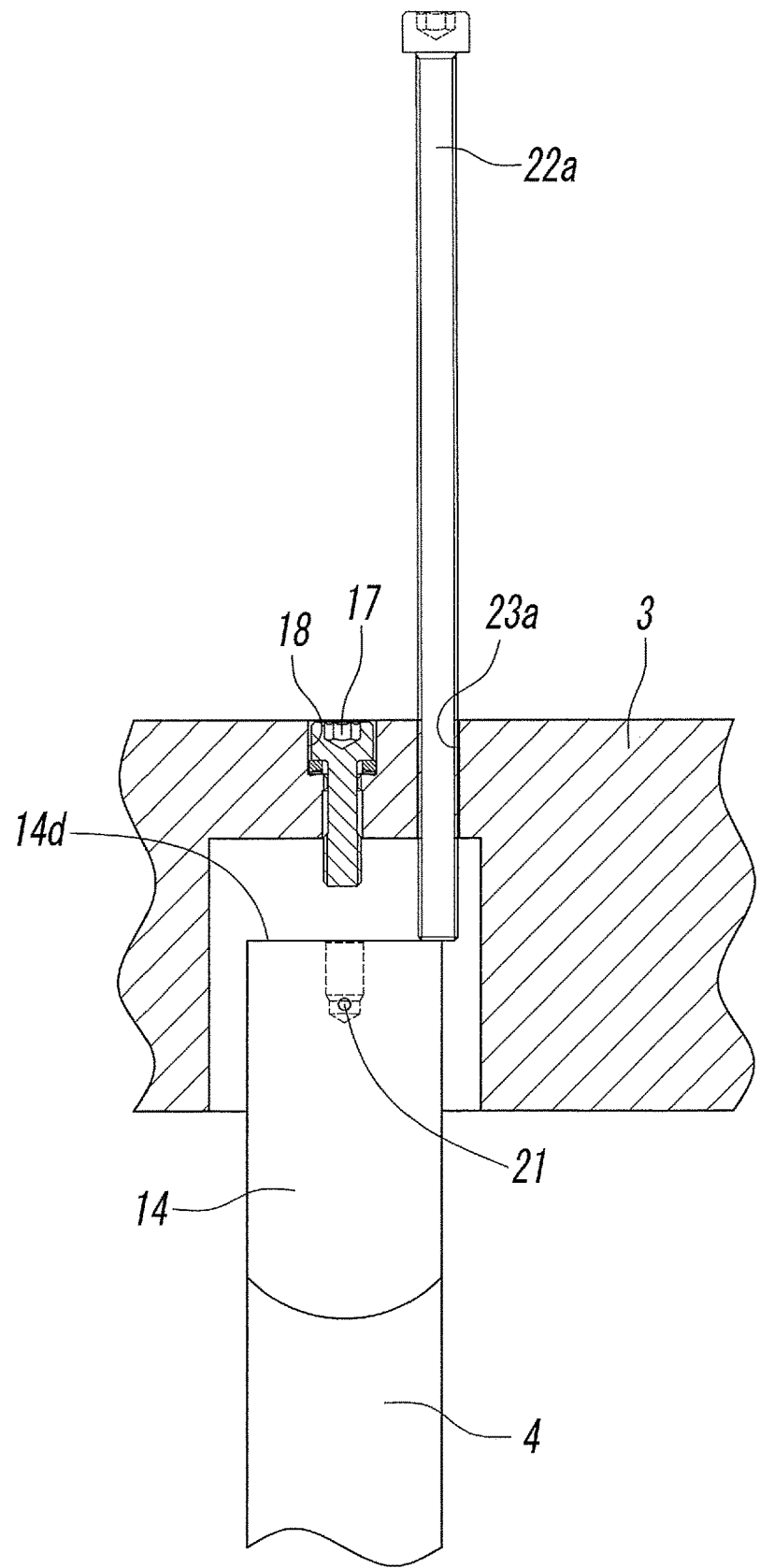
FIG. 12 is an enlarged sectional view of a main portion of FIG. 11.

When the valve plate 3 is to be removed from the valve rod 4 by using the operating tools 22a and 22b, as shown in FIGS. 9 and 10, the valve-plate fixing screw 17 is loosened by a hexagonal wrench 24 and the screw portion 17c is removed from the screw hole 19 of the mounting portion 14 of the valve rod 4, after which, as shown in FIGS. 11 and 12, the first tool 22a is screwed into the first tool mounting hole 23a.

Figure 13:
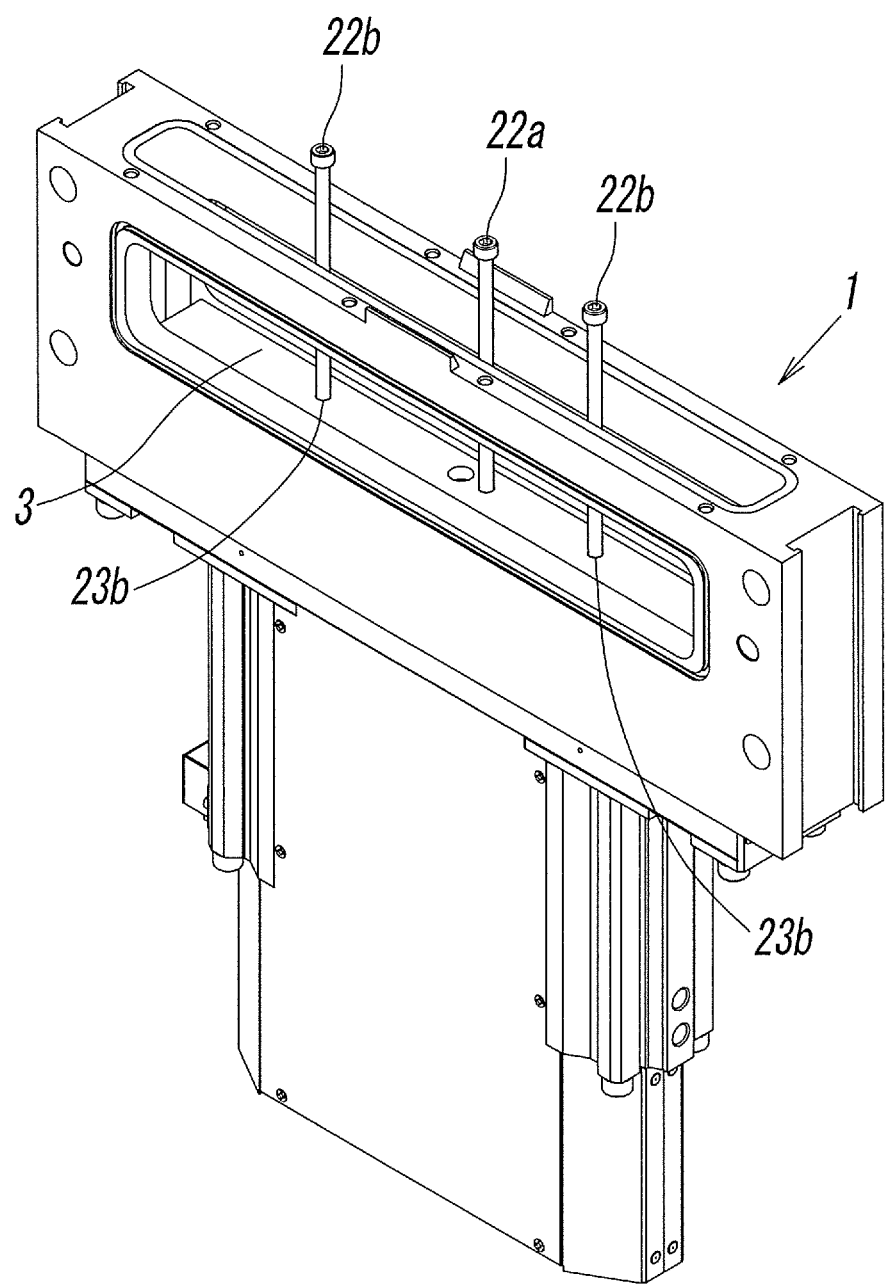
FIG. 13 is a perspective view of the gate valve in a state in which second tools have been mounted on the valve plate.

Then, the first tool 22a is tightened and an end thereof is caused to abut upon the rod end wall 14d of the valve rod 4, after which, by further tightening the first tool 22a, the valve plate 3 is raised from the valve rod 4 and is moved upward up to a position where the first inclined portion 13b1 of the mounting hole 13 and the second inclined portion 14b1 of the mounting portion 14 no longer abut upon each other. This causes the fitted state of the mounting hole 13 and the mounting portion 14 to become loose, as a result of which, thereafter, as shown in FIG. 13, the valve plate 3 can be separated from the valve rod 4 by screwing the two second tools 22b and 22b into the two second mounting holes 23b and 23b, holding the second tools 22b and 22b with both hands, and lifting the valve plate 3.

In the gate valve having the above-described structure, a step of, when replacing the seal member 7 mounted on the valve plate 3, removing the valve plate 3 from the valve rod 4 and taking out the valve plate 3 from the valve box 1 is described again in due order with reference to the drawings.

When taking out the valve plate 3, the valve plate 3 is moved downward from an ascending position indicated by a solid line in FIG. 2 to a descending position indicated by a dashed line in the same figure.

Next, as shown in FIG. 8, by removing the cover mounting screws 11 on the upper surface of the valve box 1, the cover 10 is removed and the window hole 12 in the upper surface of the valve box 1 is opened.

Next, as shown in FIGS. 9 and 10, the hexagonal wrench 24 is inserted from the window hole 12 to loosen the valve-plate fixing screw 17, and the screw portion 17c of the valve-plate fixing screw 17 is brought into a completely removed state from the screw hole 19 in the upper end of the valve rod 4, after which, as shown in FIGS. 11 and 12, the first tool 22a is screwed into the first tool mounting hole 23a. Then, by further screwing in the first tool 22a even after an end of the first tool 22a has abutted upon the rod end wall 14d at the upper end of the rod, the valve plate 3 is raised from the valve rod 4 and is moved upward to a position where the first inclined portion 13b1 of the mounting hole 13 and the second inclined portion 14b1 of the mounting portion 14 no longer engage with each other. At this time, the valve-plate fixing screw 17 may be completely removed from the valve plate 3.

Figure 14:
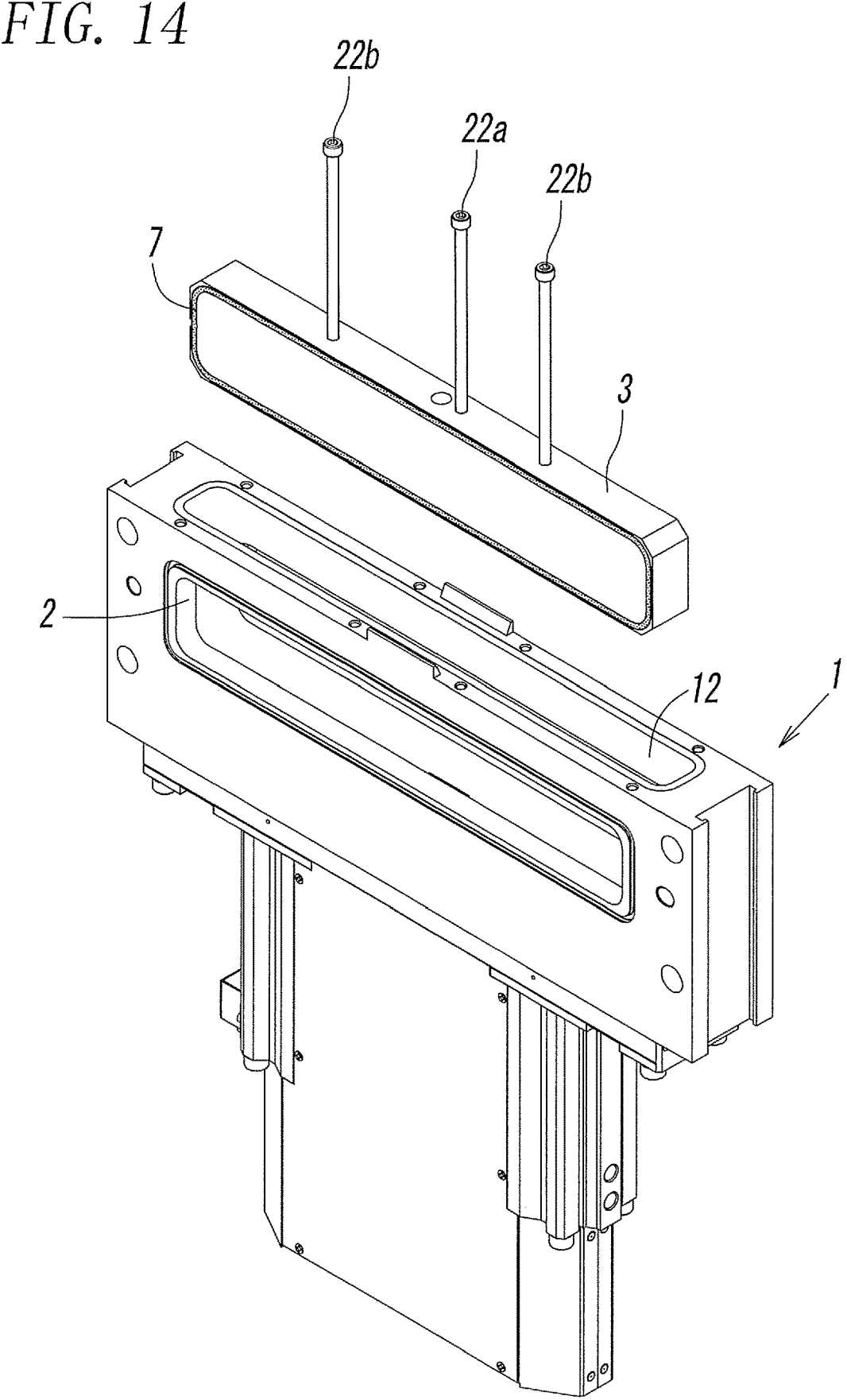
FIG. 14 is a perspective view of the gate valve in a state in which the valve plate has been taken out from the valve box.
Figure 15:
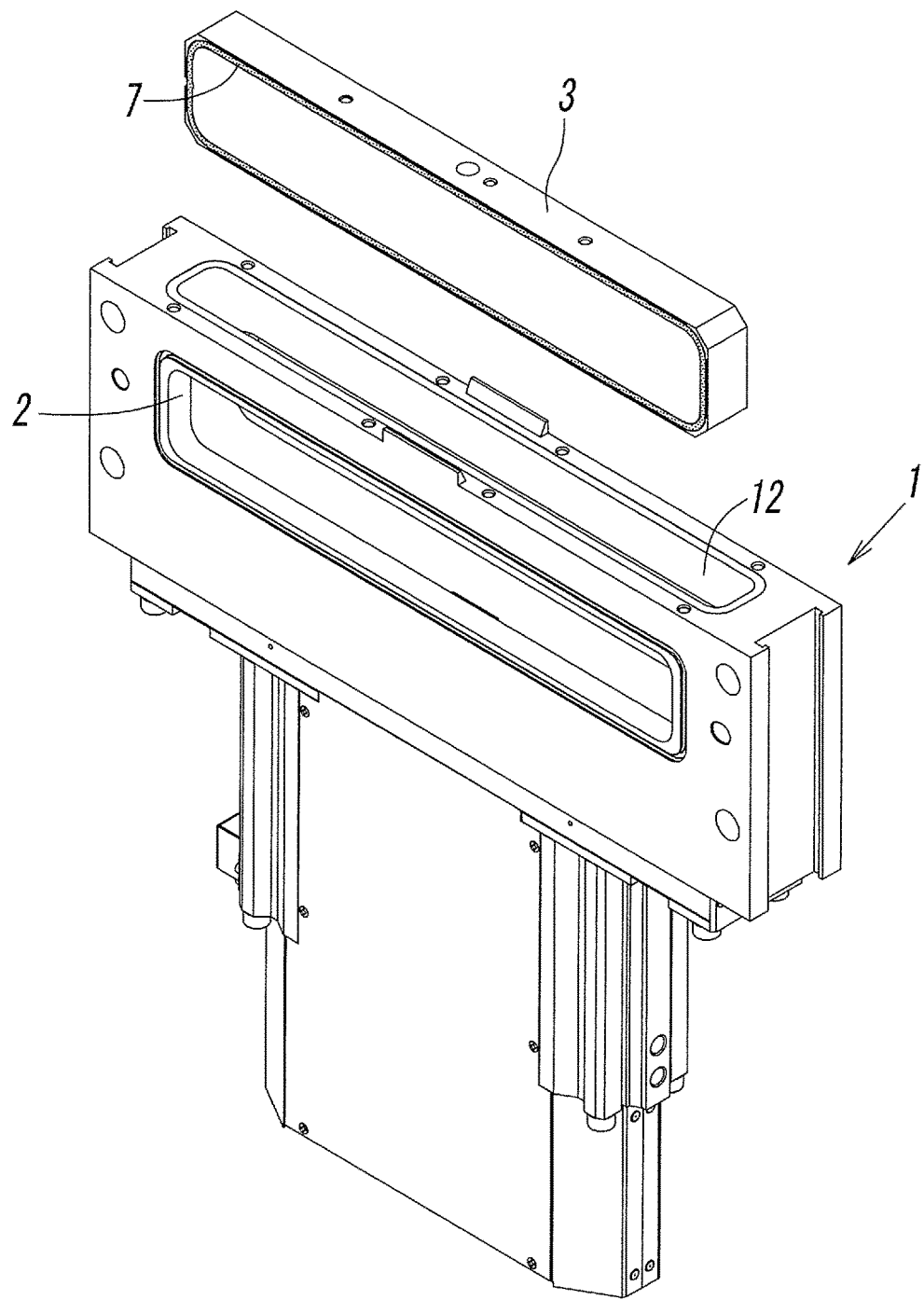
FIG. 15 is a perspective view of the gate valve in a state in which the tools have been removed from the valve plate.

Next, as shown in FIG. 13, after screwing the two second tools 22b and 22b into the two second tool mounting holes 23b and 23b, by holding the second tools 22b and 22b with both hands and lifting the valve plate 3, as shown in FIG. 14, the valve plate 3 is separated from the valve rod 4 and is taken out via the window hole 12 in the upper surface of the valve box 1. Then, as shown in FIG. 15, after removing the tools 22a and 22b from the valve plate 3, the seal member 7 is replaced.

At the valve plate 3 where the replacement of the seal member 7 has been completed, the two second tools 22b and 22b are mounted again, the second tools 22b and 22b are held with the hands to accommodate the valve plate 3 in the valve box 1, and the mounting portion 14 of the valve rod 4 is fitted into the mounting hole 13, after which the second tools 22b and 22b are removed and the valve-plate fixing screw 17 is screwed in by the hexagonal wrench 24 to fix the valve plate 3 to the valve rod 4. By mounting the cover 10 on the upper surface of the valve box 1 with the cover mounting screws 11, as shown in FIG. 7, the replacement operations of the seal member 7 are all completed and the gate valve is brought into a usable state.

In the illustrated example, as the tools 22a and 22b, screw rods having screw heads with hexagon sockets are used; however, instead of having the screw heads, the tools may have rod-shaped handles that are long sideways or columnar handles having anti-slipping vertical grooves in side surfaces.

REFERENCE SIGNS LIST 1 valve box
1a side wall
2 opening
3 valve plate
3a valve front surface
3b valve rear surface
3c valve upper surface
3d valve lower surface
4 valve rod
7 seal member
13 mounting hole
13a hole front wall
13b hole rear wall
13b1 first inclined portion
13b2 first parallel portion
13c hole side wall
13d hole end wall
13e inlet
14 mounting portion
14a rod front wall
14b rod rear wall
14b1 second inclined portion
14b2 second parallel portion
14c rod side wall
14d rod end wall
14e base end portion
17 valve-plate fixing screw
18 screw insertion hole
19 screw hole
21 air hole
22a, 22b tool
23a, 23b tool mounting hole
W1, W2 interval
G1, G2 gap
H vertical width

The invention claimed is:

1. In a gate valve configured such that a valve plate mounted on an end of a valve rod is accommodated in a valve box and an opening formed in a side wall of the valve box is opened and closed by the valve plate, a mounting structure of the valve plate with respect to the valve rod that is a mounting structure for mounting the valve plate onto the end of the valve rod so as to be removable in a direction of an axis of the valve rod, wherein the valve plate includes a valve front surface on which a seal member is mounted, a valve rear surface on a side opposite to the valve front surface, a valve upper surface and a valve lower surface, and a mounting hole formed in the valve lower surface, wherein the mounting hole has a shape of a slot that is long and narrow in a left-right direction of the valve plate and includes a hole front wall that is located on a side of the valve front surface, a hole rear wall that is located on a side of the valve rear surface, left and right hole side walls, and a hole end wall, which is an end portion of the mounting hole in a depth direction, wherein the valve rod includes a mounting portion that is inserted into the mounting hole, and the mounting portion includes a rod front wall that faces the hole front wall of the mounting hole, a rod rear wall that faces the hole rear wall of the mounting hole, left and right rod side walls, and a rod end wall that faces the hole end wall of the mounting hole, wherein in the valve upper surface of the valve plate and in the rod end wall of the valve rod, a screw insertion hole and a screw hole for mounting a valve-plate fixing screw that fixes the valve plate to the valve rod are formed on the axis of the valve rod, wherein an air hole for allowing air in the screw hole to escape to outside is formed in the mounting portion of the valve rod so as to communicate with a gap between the mounting portion and the mounting hole, and wherein in a part of the hole rear wall of the mounting hole and a part of the rod rear wall of the mounting portion, respective inclined portions that, by abutting upon each other, cause the rod front wall of the mounting portion and the hole front wall of the mounting hole to be in close contact with each other are formed when the mounting portion has been inserted into the mounting hole and the valve plate has been fixed to the valve rod with the valve-plate fixing screw.

2. The mounting structure of the valve plate with respect to the valve rod according to claim 1, wherein the hole front wall, the hole rear wall, and the hole end wall of the mounting hole, and the rod front wall, the rod rear wall, and the rod end wall of the mounting portion are each flat.

3. The mounting structure of the valve plate with respect to the valve rod according to claim 1, wherein a first tool mounting hole, which is formed from a screw hole, is formed in the valve upper surface of the valve plate in order to displace the valve plate with respect to the valve rod in the direction of the axis by screwing in a first tool, which is formed from a screw rod, and wherein the first tool mounting hole is formed at a position in the valve upper surface that is adjacent to the screw insertion hole and that is in correspondence with the rod end wall of the valve rod so as to reach the mounting hole from the valve upper surface.

4. The mounting structure of the valve plate with respect to the valve rod according to claim 1, wherein two second tool mounting holes are formed in the valve upper surface of the valve plate in order to mount a second tool for lifting the valve plate in the direction of the axis and removing the valve plate from the valve rod, and wherein the two second tool mounting holes are formed at symmetrical positions, one on a left and one on a right of the screw insertion hole in the valve upper surface.

5. In a gate valve configured such that a valve plate mounted on an end of a valve rod is accommodated in a valve box and an opening formed in a side wall of the valve box is opened and closed by the valve plate, a mounting structure of the valve plate with respect to the valve rod that is a mounting structure for mounting the valve plate onto the end of the valve rod so as to be removable in a direction of an axis of the valve rod, wherein the valve plate includes a valve front surface on which a seal member is mounted, a valve rear surface on a side opposite to the valve front surface, a valve upper surface and a valve lower surface, and a mounting hole formed in the valve lower surface, wherein the mounting hole has a shape of a slot that is long and narrow in a left-right direction of the valve plate and includes a hole front wall that is located on a side of the valve front surface, a hole rear wall that is located on a side of the valve rear surface, left and right hole side walls, and a hole end wall, which is an end portion of the mounting hole in a depth direction, wherein the valve rod includes a mounting portion that is inserted into the mounting hole, and the mounting portion includes a rod front wall that faces the hole front wall of the mounting hole, a rod rear wall that faces the hole rear wall of the mounting hole, left and right rod side walls, and a rod end wall that faces the hole end wall of the mounting hole, wherein in the valve upper surface of the valve plate and in the rod end wall of the valve rod, a screw insertion hole and a screw hole for mounting a valve-plate fixing screw that fixes the valve plate to the valve rod are formed on the axis of the valve rod, wherein in a part of the hole rear wall of the mounting hole and a part of the rod rear wall of the mounting portion, respective inclined portions that, by abutting upon each other, cause the rod front wall of the mounting portion and the hole front wall of the mounting hole to be in close contact with each other are formed when the mounting portion has been inserted into the mounting hole and the valve plate has been fixed to the valve rod with the valve-plate fixing screw, wherein the hole front wall, the hole rear wall, and the hole end wall of the mounting hole, and the rod front wall, the rod rear wall, and the rod end wall of the mounting portion are each flat, wherein the inclined portion formed at the hole rear wall of the mounting hole is a first inclined portion, and the first inclined portion is formed at a portion from an intermediate position of the mounting hole in the depth direction to an inlet of the mounting hole, and is inclined in a direction in which an interval between the hole rear wall and the hole front wall gradually increases with decreasing distance from the inlet, and wherein the inclined portion formed at the rod rear wall of the mounting portion is a second inclined portion, and the second inclined portion is formed at a portion from an intermediate position of the mounting portion in the direction of the axis to a base end portion of the mounting portion, and is inclined in a direction in which an interval between the rod rear wall and the rod front wall gradually increases with decreasing distance from the base end portion.

6. The mounting structure of the valve plate with respect to the valve rod according to claim 5, wherein the hole rear wall of the mounting hole includes a first parallel portion that is between the hole end wall and the first inclined portion and is parallel to the hole front wall, the rod rear wall of the mounting portion includes a second parallel portion that is between the rod end wall and the second inclined portion and is parallel to the rod front wall, and a width (M2) of the first parallel portion in the direction of the axis is larger than a width of the second parallel portion in the direction of the axis.

7. In a gate valve configured such that a valve plate mounted on an end of a valve rod is accommodated in a valve box and an opening formed in a side wall of the valve box is opened and closed by the valve plate, a mounting structure of the valve plate with respect to the valve rod that is a mounting structure for mounting the valve plate onto the end of the valve rod so as to be removable in a direction of an axis of the valve rod, wherein the valve plate includes a valve front surface on which a seal member is mounted, a valve rear surface on a side opposite to the valve front surface, a valve upper surface and a valve lower surface, and a mounting hole formed in the valve lower surface, wherein cross-sectional shape of the mounting hole has a shape of a slot that is long and narrow in a left-right direction of the valve plate and includes a flat hole front wall that is located on a side of the valve front surface, a hole rear wall that is located on a side of the valve rear surface, left and right hole side walls, and a hole end wall, which is an end portion of the mounting hole in a depth direction, wherein the valve rod includes a mounting portion that is inserted into the mounting hole, and the mounting portion includes a flat rod front wall that faces the hole front wall of the mounting hole, a rod rear wall that faces the hole rear wall of the mounting hole, left and right rod side walls, and a rod end wall that faces the hole end wall of the mounting hole, wherein in the valve upper surface of the valve plate and in the rod end wall of the valve rod, a screw insertion hole and a screw hole for mounting a valve-plate fixing screw that fixes the valve plate to the valve rod are formed on the axis of the valve rod, and wherein when the mounting portion is inserted into the mounting hole and the valve plate is fixed to the valve rod with the valve plate fixing screw, a part of the rod rear wall abuts against a part of the hole rear wall, a remaining part of the rod rear wall and a remaining part of the hole rear wall are contactless with each other, and facing surfaces of the rod front wall and the hole front wall are in close contact with each other.

8. The mounting structure of the valve plate with respect to the valve rod according to claim 7, wherein the part of the rod rear wall is a part near the base end portion of the mounting portion, the part of the hole rear wall is at the entrance side of the mounting hole.

9. The mounting structure of the valve plate with respect to the valve rod according to claim 7, wherein a gap is included between the left and right rod side walls of the mounting portion and the left and right hole side walls of the mounting hole.

10. The mounting structure of the valve plate with respect to the valve rod according to claim 7, wherein an air hole for allowing air in the screw hole to escape to outside is formed in the mounting portion of the valve rod so as to communicate with a gap between the mounting portion and the mounting hole.

* * * * *